(12) United States Patent
Kibodeaux et al.

(10) Patent No.: US 11,988,794 B2
(45) Date of Patent: May 21, 2024

(54) ACCOMMODATING NON-DARCIAN EFFECTS OF SLIP FLOW AND KNUDSEN DIFFUSION ON GAS FLOW FOR USE IN RESERVOIR SIMULATIONS (71) Applicant: Saudi Arabian Oil Company, Dhahran (SA)

(72) Inventors: Kenneth Richard Kibodeaux, Pearland, TX (US); HuiHai Liu, Katy, TX (US)

(73) Assignee: Saudi Arabian Oil Company, Dhahran (SA)

(*) Notice: Subject to any disclaimer, the term of this patent is extended or adjusted under 35 U.S.C. 154(b) by 347 days.

(21) Appl. No.: 17/039,012

(22) Filed: Sep. 30, 2020

(65) Prior Publication Data
US 2021/0165127 A1 Jun. 3, 2021

Related U.S. Application Data (60) Provisional application No. 62/942,949, filed on Dec. 3, 2019.

(51) Int. Cl.
*G01V 20/00* (2024.01)
*G01N 11/00* (2006.01)
(Continued)

(52) U.S. Cl.
CPC .............. *G01V 20/00* (2024.01); *G01N 11/00* (2013.01); *G01N 15/088* (2013.01); *G06F 30/20* (2020.01);
(Continued)

(58) Field of Classification Search
CPC .... G01V 99/005; G01N 11/00; G01N 15/088; G01N 15/0826; G01N 2011/0013;
(Continued)

(56) References Cited

U.S. PATENT DOCUMENTS 8,788,250 B2    7/2014  Kaminsky et al.
2015/0120255 A1  4/2015  King et al.
(Continued)

FOREIGN PATENT DOCUMENTS

WO   WO2014/123966   *  8/2014   ............. G01N 15/08
WO   WO 2014123966      8/2014

OTHER PUBLICATIONS

Sigal et al. "On the Equilibrium State of Shale Gas Reservoirs" SPWLA 56th Annual Logging Symposium, Jul. 18-22, 2015 [retrieved on Oct. 1, 2022] (Year: 2015).*
(Continued)

*Primary Examiner* — Rehana Perveen
*Assistant Examiner* — Alfred H B Wechselberger
(74) *Attorney, Agent, or Firm* — Fish & Richardson P.C.

(57) ABSTRACT

Systems and methods include a method for using reservoir simulations. Permeabilities are measured from a rock sample at different pressures using single-component gas and bulk gas viscosity values. The rock sample is representative of rock used in a reservoir simulation. For each gas component of reservoir gas, porosities are determined, including determining mean free paths for a range of temperatures and pressures encompassing conditions for both reservoir simulation input and the measured permeabilities. A characteristic pore radius for the rock is determined using the measured permeabilities and the determined porosities. Viscosity adjustment factors for a predefined range of temperatures and pressures are determined using the measured permeabilities. Adjusted gas viscosities for the predefined range of temperatures and pressures and the measured permeabilities are determined using the viscosity adjustment factors. The reservoir simulator is executed using the adjusted gas viscosities.

17 Claims, 4 Drawing Sheets (51) Int. Cl.
*G01N 15/08* (2006.01)
*G06F 30/20* (2020.01)
*G06F 111/10* (2020.01)
*G06F 113/08* (2020.01)

(52) U.S. Cl.
CPC ....... *G06F 2111/10* (2020.01); *G06F 2113/08* (2020.01)

(58) Field of Classification Search
CPC .. G06F 30/20; G06F 2111/10–2119/00; G06F 2113/08; G06F 30/25; G06F 30/27; G06F 30/28; E21B 2200/20; E21B 49/02
See application file for complete search history.

(56) References Cited

U.S. PATENT DOCUMENTS

| | | |
|---|---|---|
| 2015/0369718 A1 | 12/2015 | Andreevich et al. |
| 2016/0178800 A1* | 6/2016 | Ramsay ............... G01V 99/005 702/12 |
| 2019/0234859 A1 | 8/2019 | Chen et al. |

OTHER PUBLICATIONS

Liu et al. "Pore-Scale Simulations of Gas Displacing Liquid in a Homogeneous Pore Network Using the Lattice Boltzmann Method" Transp Porous Med (2013), vol. 99, pp. 555-580; DOI:10.1007/s11242-013-0200-8 [retrieved on Oct. 17, 2022] (Year: 2013).*
Song et al. "Numerical investigation of gas flow rate in shale gas reservoirs with nanoporous media" International Journal of Heat and Mass Transfer, vol. 80 (2015), pp. 626-635 [retrieved on Oct. 17, 2022] (Year: 2015).*
Li et al. "Effect of distinguishing apparent permeability on flowing gas composition, composition change and composition derivative in tight- and shale-gas reservoir" Journal of Petroleum Science and Engineering vol. 128 (2015), pp. 107-114 [retrieved Oct. 17, 2022] (Year: 2015).*
Bhatia et al. "Modeling Mixture Transport at the Nanoscale: Departure from Existing Paradigms" Physics Review Letters, vol. 100, 236103 [retrieved on Oct. 17, 2022] (Year: 2008).*
Pruess et al. "TOUGH2 Software Qualification" LBL-38383, UC-814, Ernest Orlando Lawrence Berkeley National Laboratory [ retrieved Oct. 17, 2022] (Year: 1996).*
Chai et al. "Gas transport in shale matrix coupling multilayer adsorption and pore confinement effect" Chemical Engineering Journal , vol. 370 (2019), pp. 1534-1549 [retrieved on Sep. 22, 2022] (Year: 2019).*
Moridis, G. "User's Manual of the Tough+ Core Code v1.5: A General-Purpose Simulator of Non-Isothermal Flow and Transport Through Porous and Fractured Media" Earth Science Division, Lawrence Berkeley National Laboratory [retrieved on Oct. 17, 2022] (Year: 2014).*
Wu et al. "A Model for Real Gas Transfer in Nanopores of Shale Gas Reservoirs" SPE-174293-MS, EUROPEC 2015, Madrid, Spain [retrieved on Sep. 22, 2022] (Year: 2015).*
GCC Examination Report issued in Gulf Cooperation Council Appln. No. 2020-40988, dated Oct. 20, 2021, 4 pages.
PCT International Search Report and Written Opinion issued in International Application No. PCT/US2020/062576 dated Mar. 15, 2021, 17 pages.
Chai et al., "Gas Transport in Shale Matric Coupling Multilayer Adsorption and Pore Confinement Effect," Chemical Engineering Journal, Mar. 29, 2019, 370: 1534-1549, 16 pages.

* cited by examiner

ACCOMMODATING NON-DARCIAN EFFECTS OF SLIP FLOW AND KNUDSEN DIFFUSION ON GAS FLOW FOR USE IN RESERVOIR SIMULATIONS

CROSS-REFERENCE TO RELATED APPLICATION

This application claims the benefit of U.S. Provisional Application 62/942,949, filed on Dec. 3, 2019, the contents of which are incorporated herein by reference in their entirety.

TECHNICAL FIELD

This description relates generally to modeling associated with gas field and oilfield production, for example, to accommodating non-Darcian effects of slip flow and Knudsen diffusion on gas flow for use in reservoir simulations.

BACKGROUND

The present disclosure applies to techniques used in modeling associated with gas field and oilfield production. For example, nanoporous source rocks (often called "shales" and "unconventionals") can be exploited as petroleum reservoirs by using multistage hydraulic fracturing of horizontal production wells. Propped hydrofracture lobes are often surrounded by a region of enhanced permeability attributable to natural microcracks in the rock. The microcracks can be activated using high-pressure fracturing fluid, for example. The extent of an activated network of unpropped microcracks is referred to as Stimulated Rock Volume (SRV). Historically, the Estimated Ultimate Recovery EUR (EUR) of oil and gas wells has typically originated from the SRV. This is because the unstimulated rock beyond the SRV is virtually impermeable considering oilfield production timescales.

The effective permeability of shale rock with activated microcracks is dominated by flow in the microcracks. This is typically true whether the shale rock been activated in situ by fracturing fluid or by the relief of confining stress (and mechanical disturbance) incumbent in coring. This effective permeability enables flow through, and into, an element of rock. However, for the flow of the shale rock's native fluids out of an element of rock and into the microcracks (such as that occurring during primary depletion), fluid production is dominated by the bottleneck that is the nanoporous matrix in which the native fluids originally reside. Therefore, in the course of exercises to predict reservoir recovery (such as computer reservoir simulation), it is critical to accurately capture the physics of the flow of native fluids through the nanoporous matrix, from an original location to the network of microcracks.

SUMMARY

The present disclosure describes techniques that can be used for accommodating non-Darcian effects of slip flow and Knudsen diffusion (SFKD) on gas flow, and for including compositional dependence in reservoir modeling using a reservoir simulator. In some implementations, a computer-implemented method includes the following. Permeabilities are measured from a rock sample at different pressures using single-component gas and bulk gas viscosity values. The rock sample is representative of rock used in a reservoir simulation. For each gas component of reservoir gas, porosities are determined, including determining mean free paths for a range of temperatures and pressures encompassing conditions for both reservoir simulation input and the measured permeabilities. A characteristic pore radius for the rock is determined using the measured permeabilities and the determined porosities. Viscosity adjustment factors for a predefined range of temperatures and pressures are determined using the measured permeabilities. Adjusted gas viscosities for the predefined range of temperatures and pressures and the measured permeabilities are determined using the viscosity adjustment factors. The reservoir simulator is executed using the adjusted gas viscosities.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. First, gas viscosity can be used in place of permeability to represent SFKD effects on gas flow. Second, SFKD adjustments can be made separately to the individual gas components that together can represent composite SFKD effects for realistic gas mixtures. Third, SFKD behavior can be modeled in reservoir modeling by determining intrinsic permeability values and implementing SFKD-adjusted viscosity values into the simulator. Fourth, temperature and pressure dependencies can be captured. Fifth, SFKD-adjusted viscosities can be used for all gas components. Sixth, modeling can capture the compositional dependencies of SFKD. Seventh, the techniques can be implemented using existing reservoir simulators with requiring additional training, design, programming, software, or hardware. Eighth, the techniques are more accurate than Klinkenberg methods that are customarily used.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

BRIEF DESCRIPTION OF THE DRAWINGS

Like reference numbers and designations in the various drawings indicate like elements.

DETAILED DESCRIPTION

The following detailed description describes techniques for accommodating non-Darcian effects of slip flow and Knudsen diffusion (SFKD) on gas flow, and for including compositional dependence in reservoir modeling using a reservoir simulator. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

The techniques of the present disclosure can be used in the course of exercises to predict reservoir recovery (such as using computer reservoir simulation). The techniques can further be used to accurately capture the physics of the flow of native fluids through the nanoporous matrix, from an original location through a network of microcracks.

Regarding nanoporous shale-matrix flow, it is well-known that as pore-size gets smaller, fluid pressure gets smaller, and fluids get lighter. In this sense, the behavior of fluid flow in porous media seems to deviate from Darcy's Law. As such, these conditions can lead to under-predicting flow rates when invoking the value of bulk-phase gas viscosity $\mu_{gbulk}$ for the apparent gas viscosity $\mu_{gapp}$. For example, consider Equation (1):

$$K = (Q_g \cdot \mu_{gapp} \cdot L)/(\Delta P \cdot A) \qquad (1)$$

where K is the intrinsic rock permeability, $Q_g$ is a volumetric gas flow rate, for example, in cubic feet per minute (CFM), L is a rock sample length, $\Delta P$ is the pressure drop across the sample, and A is the cross-sectional area of the sample. This apparent deviation is commonly referred to as the Klinkenberg effect, which is caused by a SFKD in the flowing vapor phase. SFKD results in the apparent mobility of the fluid being greater than that predicted by Darcy's Law when the bulk-phase value of gas viscosity $\mu_{gbulk}$ is invoked. The gas mobility term in Darcy's Law is quantified by $K/\mu_{gapp}$, where the permeability K characterizes the fluid flow resistance inherent in the rock's tortuous pore-network geometry, and the apparent gas viscosity $\mu_{gapp}$ characterizes the flow resistance inherent in the behavior of the vapor phase at prevailing conditions. Since SFKD results in an increase in gas mobility, modeling gas mobility requires either increasing the value of K or reducing the value of $\mu_{gapp}$.

In interpreting a gas-flow coreflood for determining permeability, experiments may typically reveal only mobility, not permeability. Values may be known for all of the parameters in Darcy's Law (for example, Equation (1)) except for the two elements of gas mobility: K and $\mu_{gapp}$. Permeability K can be determined by subsequently using a value of apparent gas viscosity. Klinkenberg-based techniques can be used to direct the invocation of the value of bulk-phase gas viscosity for apparent gas viscosity in Darcy's Law, resulting in a pseudo-permeability. As such, a new relationship between this experimentally-derived pseudo-permeability K' and the rock permeability K can be represented as shown in Equation (2):

$$K' = K \cdot \left(1 + \frac{b}{P}\right) = (Q_g \cdot \mu_{gbulk} \cdot L)/(\Delta P \cdot A) \qquad (2)$$

Typically, this relationship can be applied to corefloods at multiple pressure values to ascertain multiple K' values. Plotting the multiple K' values as a function of 1/P can reveal, for example, a value of K in which a straight line through the points intersects with 1/P=0. Also, the slope of this line is K·b, from which a value for b can be obtained.

As modeling efforts (for example, laboratory or field processes) seek to capture increasingly tighter rocks, increasingly lower pressures, and increasingly lighter fluids, it is beneficial that the model is able to predict the range of SFKD behavior. Predictions can be attempted, for example, by invoking the Klinkenberg b factor and assuming that intrinsic permeability changes as one or more of P, gas density, and pore-size decreases into the regime where SFKD is active. However, inherent errors can occur in this common practice of assigning SFKD behavior to a permeability value. This is because the permeability is used not only in calculations for vapor phase flow, but also for flows of oleic and aqueous phases. Adjustments of the permeability value to account for deviations occurring only in the vapor phase can lead to errors in determining oil and water flow rates. Furthermore, such errors in flow rates can mean that fractional-flow values are inaccurate, resulting in gridblock values of the volumetric phase saturations ($S_g$, $S_w$, and $S_o$) that would be in error. This typically causes errors in the values of the relative permeabilities, which in turn leads to further errors in determining the flow rates.

Some simulators are capable of techniques accommodating input of the Klinkenberg factor b, and the b-adjusted value of K can be used only for the gas phase. At least two problems can occur regarding the Klinkenberg factor b. First, the intrinsic permeability is intended to capture the degree of flow resistance owing to the rock's particular tortuous pore-network geometry. As such, the value of intrinsic permeability should not change unless there is a change in that geometry (which is not the case in this example, making accommodation improper). Second, use of the Klinkenberg factor b can be susceptible to any errors intrinsic in the Klinkenberg formula. Also, other simulation functions having a permeability dependence will be incorrect. Moreover, techniques accommodating the input of the Klinkenberg factor b do not account for the dependence of SFKD on gas composition and temperature.

Techniques of the present disclosure operate merely by adjusting the values of viscosity that are input into the reservoir simulator, rather than adjusting the permeability. These adjustments are straightforward and based on established relationships for non-Darcian flow of confined gas owing to SFKD. Also, the parameters in these relationships can be tuned to match laboratory experiments on the rock of interest.

For a given rock formation and for each gas component, a two-dimensional table of adjustment factors can be computed as a function of temperature and pressure. These tables can be used to produce a table of adjusted viscosity values for each gas component. The adjusted viscosity values and the unadjusted intrinsic permeability of the rock formation can be input into the simulator. In some implementations, the following twelve steps of a workflow can be used to determine values to use in a model simulator.

First, using a sample of the rock that is representative of the rock in the reservoir simulation, the permeability can be measured at various pressures using a single-component gas and using the bulk gas viscosity value. In some implementations, the Klinkenberg method can be used to ascertain first-pass intrinsic permeability values.

Second, for each component in the reservoir gas, the mean free path of the component can be determined for a range of temperatures and pressures encompassing conditions for both the reservoir-simulation input and the permeability experiments of the first step. This step can be repeated for the lab gas used in the first step.

Third, a value of characteristic pore radius for the rock can be determined using a form of the Carmen-Kozeny (CK) equation and the measured values of permeability and porosity. In this step, better results can result using a form of the CK equation that includes adjustable parameters.

Fourth, the computed radius can be used with an equation for computing viscosity adjustment (for example, a Beskok-Karniadakis or Helmholtz equation). The mean free path for the gas can be used to compute viscosity adjustment factor $V_c$ for a range of temperatures and pressures encompassing conditions for both the reservoir-simulation input and the permeability experiments in the first step.

Fifth, using a table of $V_c$ values for the lab gas, a column corresponding to the laboratory temperature can be located. Then, a column of bulk viscosity values for the same pressures as the $V_c$ column can be identified. The two columns can be multiplied to create a column of adjusted gas viscosity versus pressure at lab temperatures for the lab gas and the lab rock sample.

Sixth, for each lab datum, the permeability can be re-computed using the value of adjusted gas viscosity at the pressure of the datum.

Seventh, on a plot of permeability versus pressure, the original data (computed with bulk gas viscosity) and the data using the adjusted values can be plotted.

Eighth, the value of the adjustable CK parameter can be altered to fine-tune the look of the improved curves as desired. This is a way of tuning the adjustable CK parameter for the specific rock, as the CK equation is non-exact. Note that each adjustment requires repeating the workflow back to the third step with the updated values of permeability and the CK parameter Ninth, the current value of the CK parameter is assigned to be the proper one for the lab rock.

Tenth, the fourth step can be repeated for all of the reservoir-gas components. Each of the $V_c$ tables can be multiplied by a table of bulk-gas-viscosity values of each gas. This creates a table of adjusted gas viscosity for each gas.

Eleventh, these adjusted viscosities tables can be used in place of the unadjusted ones in the reservoir simulation.

Twelfth, the intrinsic permeability (the one computed from experiments using the adjusted gas viscosity) can be input in the reservoir simulator.

Using this workflow, the simulation model can be prepared to accurately capture SFKD (including temperature, pressure, and gas-composition dependencies) in simulation model predictions, employing only the normal capabilities of currently-used reservoir simulators.

Figure 1:
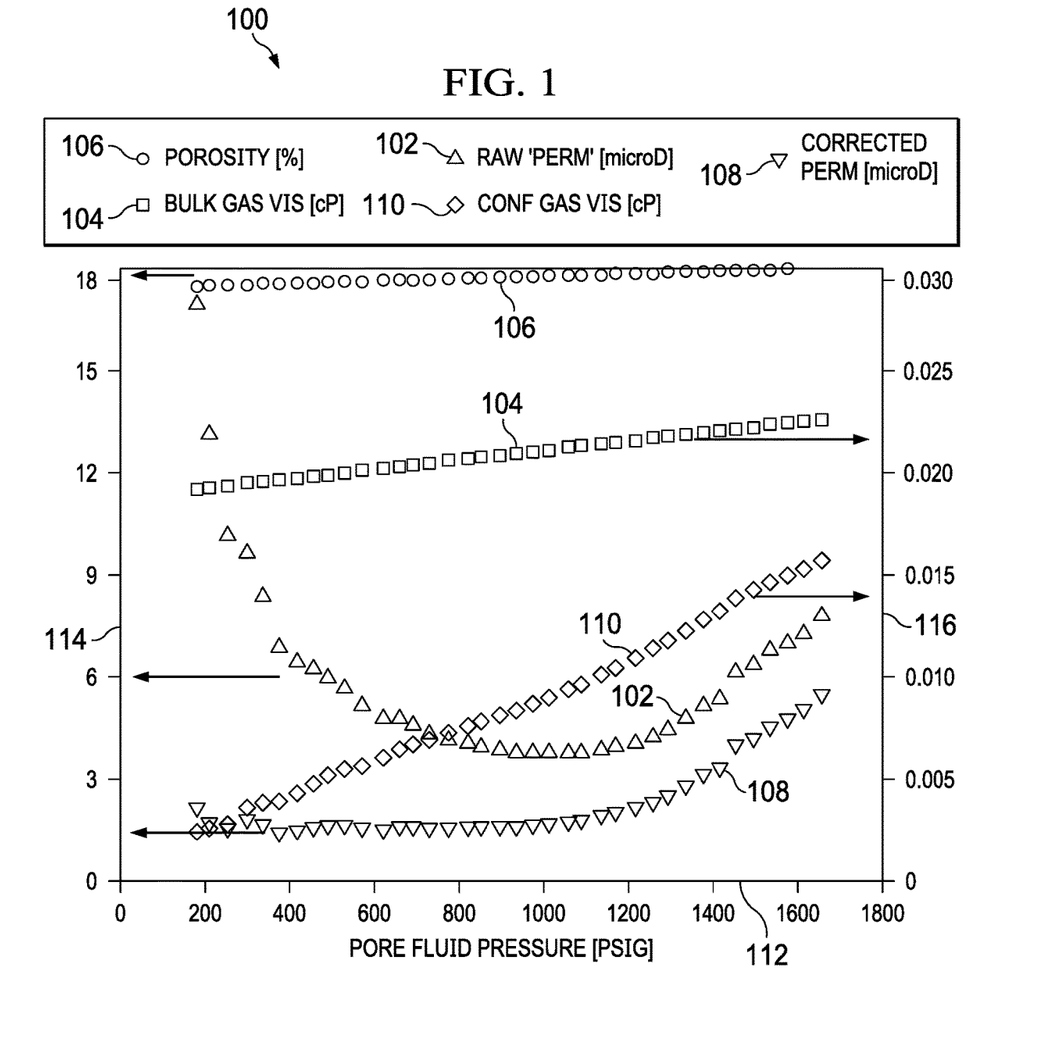
FIG. 1 is a graph showing examples of curves of pore fluid pressure, according to some implementations of the present disclosure.

FIG. 1 is a graph 100 showing examples of curves of pore fluid pressure, according to some implementations of the present disclosure. This is a single-component example case where, to mimic primary depletion, confining pressure can be held constant while pressure drops. Curves 102, 104, and 106 are raw lab data for permeability, viscosity, and porosity, respectively. Curves 108 and 110 are the proper values of permeability and viscosity, respectively, as computed using techniques of the present disclosure. Curve 110 is approximately a factor of two lower than curve 104 around 1100 psig (pounds per square inch in gauge) 112. This means that even for a conservative value of flowing bottomhole pressure, gas flow can be a factor of two greater when techniques account for SFKD. Curve 110 is the adjusted value, gained from the workflow described previously. Curves 108 and 110 provide input for reservoir simulation. Left-hand axis 114 indicates, for curve 106, a value of porosity in volume percent. For curves 102 and 108, left-hand axis 114 indicates a value of permeability in microDarcies. Right-hand y-axis 116 indicates a value of viscosity in centipoise.

Figure 2:
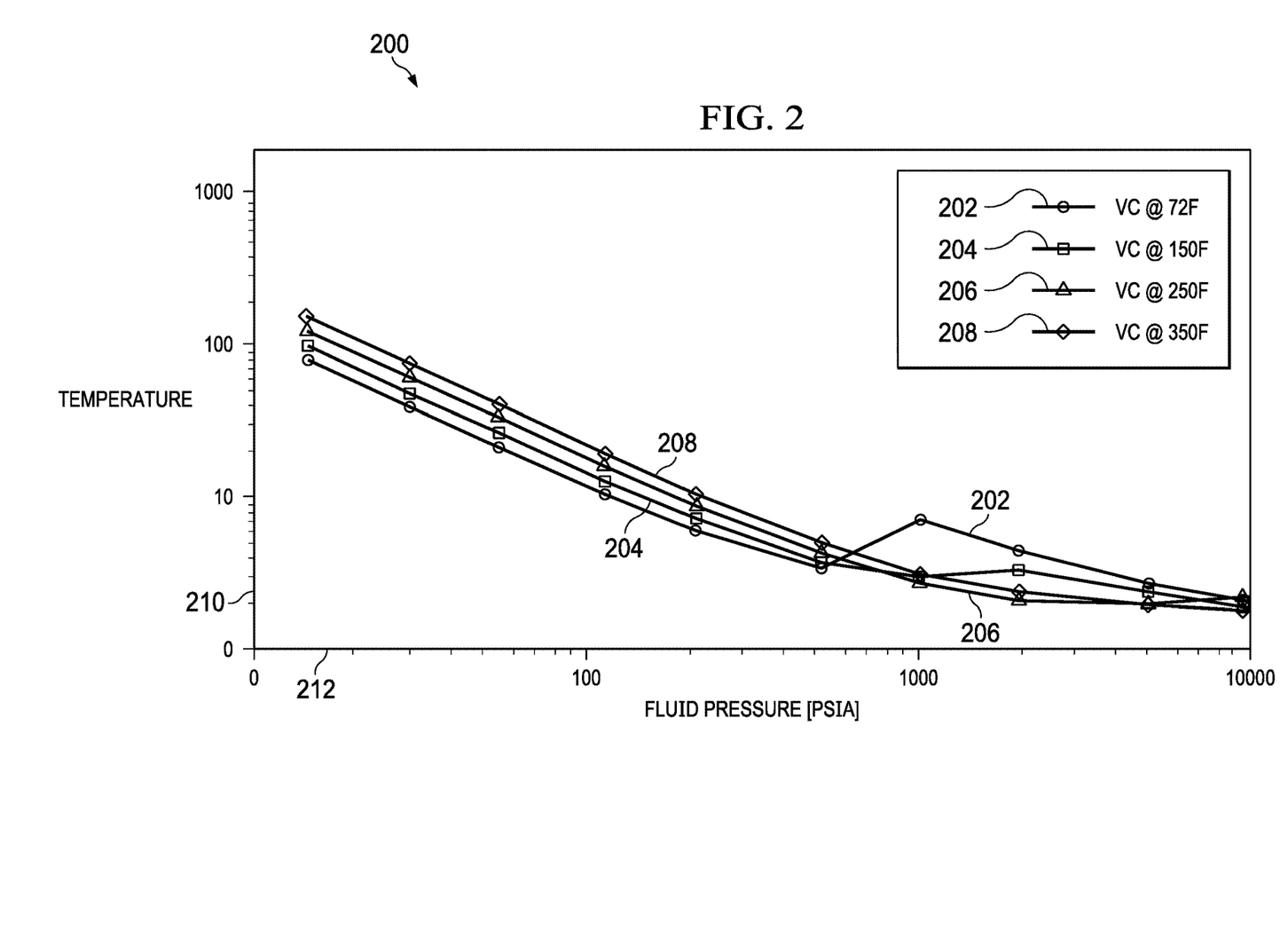
FIG. 2 is a graph showing an example of methane results, according to some implementations of the present disclosure

FIG. 2 is a graph 200 showing an example of methane results, according to some implementations of the present disclosure. The graph 200 shows how the magnitude of viscosity adjustment can be quantified at different temperatures and pressures for a single component. Given an unadjusted viscosity table of methane versus temperature and pressure (T & P) (known from industry), viscosity $V_c$ curves 202, 204, 206, and 208 derived from the plot of graph 200 can be multiplied by the methane-table values at the corresponding viscosity 210 and fluid pressure 212, for example, in pounds per square inch, absolute (psia). The resulting adjusted methane table can be used directly as input for the reservoir simulation. Repeating this process for the other components in the simulation can prepare the model to properly predict compositional SFKD effects, as well as T and P. In the graph 200, K=0.5 μD (microdarcies), porosity (a ratio of the rock's void volume to its bulk volume) Φ=9 percent, and radius r* is 2.5 nm (nanometers). Legend 214 identifies curves 202, 204, 206, and 208 and indicates how each curve represents the $V_c$ vs. P (pressure) behavior for one of four values of temperature. For example, while the value of P is identified by the x-axis (fluid pressure 212), the value of T is represented by the corresponding curve, in accordance with the legend. As such, the corresponding $V_c$ value is read from the y-axis (viscosity 210).

Figure 3:
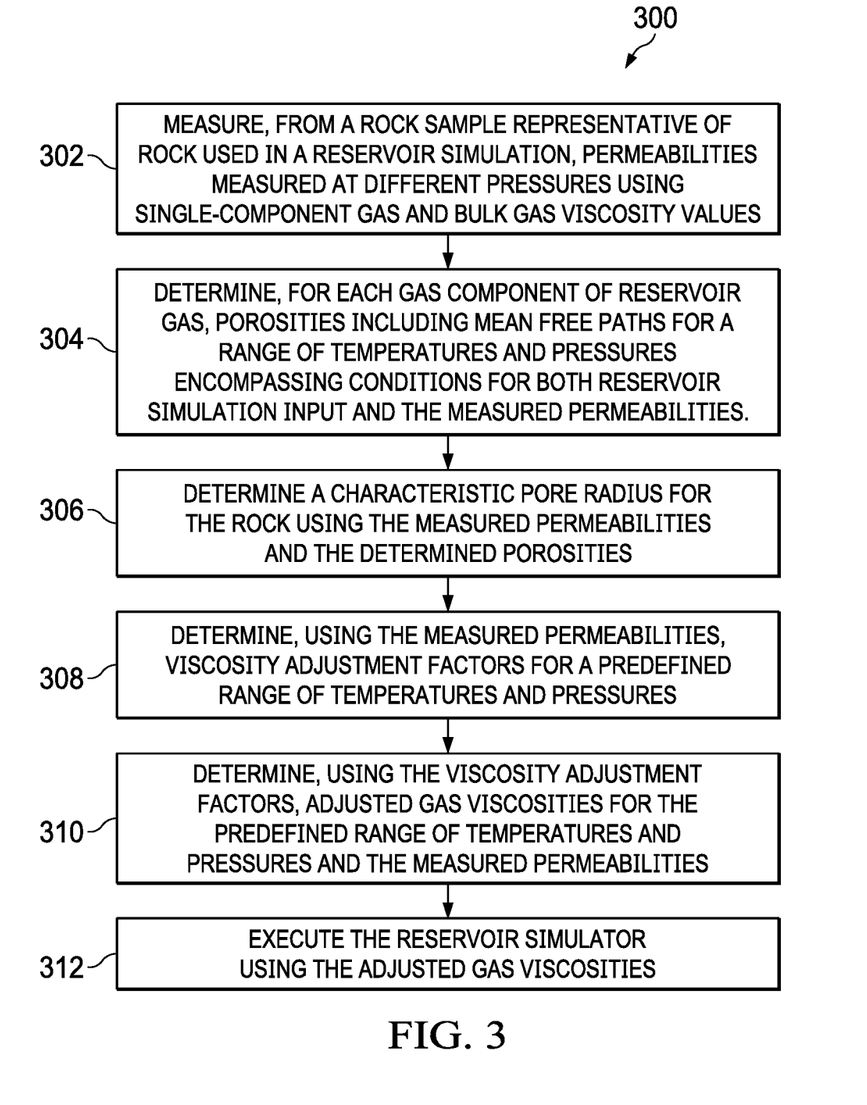
FIG. 3 is a flowchart of an example of a method for preparing and executing a simulation model accurately capture slip flow and Knudsen diffusion (SFKD), according to some implementations of the present disclosure.

FIG. 3 is a flowchart of an example of a method 300 for preparing and executing a simulation model accurately capture SFKD, according to some implementations of the present disclosure. For clarity of presentation, the description that follows generally describes method 300 in the context of the other figures in this description. However, it will be understood that method 300 can be performed, for example, by any suitable system, environment, software, and hardware, or a combination of systems, environments, software, and hardware, as appropriate. In some implementations, various steps of method 300 can be run in parallel, in combination, in loops, or in any order.

At 302, permeabilities are measured from a rock sample at different pressures using single-component gas and bulk gas viscosity values. The rock sample is representative of rock used in a reservoir simulation. As an example, the reservoir simulator can be a simulator that is used in a designing production operations at an oil well or a gas well. The reservoir simulator can be used to predict oil and gas production as a function of time from one of more already-fractured wells in a reservoir. One use of the predictions can include designing production operations (or surface production systems). Other uses can include economic analysis, including determining a number of wells and their positioning. In some implementations, measuring the permeabilities can include using a Klinkenberg method to measure the permeabilities. From 302, method 300 proceeds to 304.

At 304, for each gas component of reservoir gas, porosities are determined, including determining mean free paths for a range of temperatures and pressures encompassing conditions for both reservoir simulation input and the measured permeabilities. Different porosities exist for gas components of methane, for example, including nitrogen, carbon dioxide, and hydrogen sulfide. From 304, method 300 proceeds to 306.

At 306, a characteristic pore radius for the rock is determined using the measured permeabilities and the determined porosities. For example, determining the characteristic pore radius for the rock can include using a CK equation to determine the characteristic pore radius for the rock. From 306, method 300 proceeds to 308.

At 308, viscosity adjustment factors for a predefined range of temperatures and pressures are determined using the measured permeabilities. As an example, determining the viscosity adjustment factors for the range of temperatures and pressures can include using one of a Beskok-Karniadakis equation or a Helmholtz equation to determine the adjustment factors. From 308, method 300 proceeds to 310.

At 310, adjusted gas viscosities for the predefined range of temperatures and pressures and the measured permeabilities are determined using the viscosity adjustment factors. Different adjusted gas viscosities can exist for nitrogen, carbon dioxide, and hydrogen sulfide, for example. From 310, method 300 proceeds to 312.

At 312, the reservoir simulator is executed using the adjusted gas viscosities. Simulations can use parameters associated with the rock and other characteristics of a specific location of a gas well or oil well, for example. After 312, method 300 can stop.

In some implementations, method 300 further includes plotting graphs showing relationships among two or more of the permeabilities and viscosities. As an example, plots that are produced can include plots shown in FIGS. 1 and 2.

Figure 4:
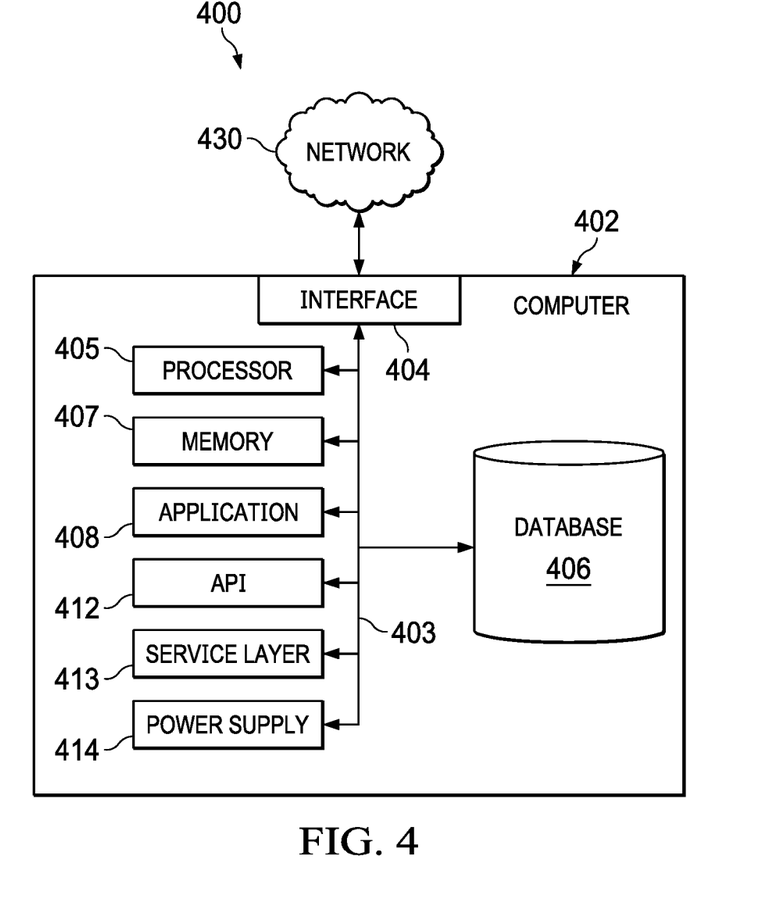
FIG. 4 is a block diagram illustrating an example computer system used to provide computational functionalities associated with described algorithms, methods, functions, processes, flows, and procedures as described in the present disclosure, according to some implementations of the present disclosure.

In some implementations, method 300 further includes providing results of the reservoir simulation in a user interface for presentation to a user and updating production operations based on user selections made in the user interface. For example, values determined by the simulation can be used as inputs used in production operations FIG. 4 is a block diagram of an example computer system 400 used to provide computational functionalities associated with described algorithms, methods, functions, processes, flows, and procedures described in the present disclosure, according to some implementations of the present disclosure. The illustrated computer 402 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 402 can include input devices such as keypads, keyboards, and touch screens that can accept user information. Also, the computer 402 can include output devices that can convey information associated with the operation of the computer 402. The information can include digital data, visual data, audio information, or a combination of information. The information can be presented in a graphical user interface (UI) (or GUI).

The computer 402 can serve in a role as a client, a network component, a server, a database, a persistency, or components of a computer system for performing the subject matter described in the present disclosure. The illustrated computer 402 is communicably coupled with a network 430. In some implementations, one or more components of the computer 402 can be configured to operate within different environments, including cloud-computing-based environments, local environments, global environments, and combinations of environments.

At a top level, the computer 402 is an electronic computing device operable to receive, transmit, process, store, and manage data and information associated with the described subject matter. According to some implementations, the computer 402 can also include, or be communicably coupled with, an application server, an email server, a web server, a caching server, a streaming data server, or a combination of servers.

The computer 402 can receive requests over network 430 from a client application (for example, executing on another computer 402). The computer 402 can respond to the received requests by processing the received requests using software applications. Requests can also be sent to the computer 402 from internal users (for example, from a command console), external (or third) parties, automated applications, entities, individuals, systems, and computers.

Each of the components of the computer 402 can communicate using a system bus 403. In some implementations, any or all of the components of the computer 402, including hardware or software components, can interface with each other or the interface 404 (or a combination of both) over the system bus 403. Interfaces can use an application programming interface (API) 412, a service layer 413, or a combination of the API 412 and service layer 413. The API 412 can include specifications for routines, data structures, and object classes. The API 412 can be either computer-language independent or dependent. The API 412 can refer to a complete interface, a single function, or a set of APIs.

The service layer 413 can provide software services to the computer 402 and other components (whether illustrated or not) that are communicably coupled to the computer 402. The functionality of the computer 402 can be accessible for all service consumers using this service layer. Software services, such as those provided by the service layer 413, can provide reusable, defined functionalities through a defined interface. For example, the interface can be software written in JAVA, C++, or a language providing data in extensible markup language (XML) format. While illustrated as an integrated component of the computer 402, in alternative implementations, the API 412 or the service layer 413 can be stand-alone components in relation to other components of the computer 402 and other components communicably coupled to the computer 402. Moreover, any or all parts of the API 412 or the service layer 413 can be implemented as child or sub-modules of another software module, enterprise application, or hardware module without departing from the scope of the present disclosure.

The computer 402 includes an interface 404. Although illustrated as a single interface 404 in FIG. 4, two or more interfaces 404 can be used according to particular needs, desires, or particular implementations of the computer 402 and the described functionality. The interface 404 can be used by the computer 402 for communicating with other systems that are connected to the network 430 (whether illustrated or not) in a distributed environment. Generally, the interface 404 can include, or be implemented using, logic encoded in software or hardware (or a combination of software and hardware) operable to communicate with the network 430. More specifically, the interface 404 can include software supporting one or more communication protocols associated with communications. As such, the network 430 or the interface's hardware can be operable to communicate physical signals within and outside of the illustrated computer 402.

The computer 402 includes a processor 405. Although illustrated as a single processor 405 in FIG. 4, two or more processors 405 can be used according to particular needs, desires, or particular implementations of the computer 402 and the described functionality. Generally, the processor 405 can execute instructions and can manipulate data to perform the operations of the computer 402, including operations using algorithms, methods, functions, processes, flows, and procedures as described in the present disclosure.

The computer 402 also includes a database 406 that can hold data for the computer 402 and other components connected to the network 430 (whether illustrated or not). For example, database 406 can be an in-memory, conventional, or a database storing data consistent with the present disclosure. In some implementations, database 406 can be a combination of two or more different database types (for example, hybrid in-memory and conventional databases) according to particular needs, desires, or particular implementations of the computer 402 and the described functionality. Although illustrated as a single database 406 in FIG. 4, two or more databases (of the same, different, or combination of types) can be used according to particular needs, desires, or particular implementations of the computer 402 and the described functionality. While database 406 is illustrated as an internal component of the computer 402, in alternative implementations, database 406 can be external to the computer 402.

The computer 402 also includes a memory 407 that can hold data for the computer 402 or a combination of components connected to the network 430 (whether illustrated or not). Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 (of the same, different, or combination of types) can be used according to particular needs, desires, or particular implementations of the computer 402 and the described functionality. While memory 407 is illustrated as an internal component of the computer 402, in alternative implementations, memory 407 can be external to the computer 402.

The application 408 can be an algorithmic software engine providing functionality according to particular needs, desires, or particular implementations of the computer 402 and the described functionality. For example, application 408 can serve as one or more components, modules, or applications. Further, although illustrated as a single application 408, the application 408 can be implemented as multiple applications 408 on the computer 402. In addition, although illustrated as internal to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion and management circuits, including recharging, standby, and power management functionalities. In some implementations, the power-supply 414 can include a power plug to allow the computer 402 to be plugged into a wall socket or a power source to, for example, power the computer 402 or recharge a rechargeable battery.

There can be any number of computers 402 associated with, or external to, a computer system containing computer 402, with each computer 402 communicating over network 430. Further, the terms "client," "user," and other appropriate terminology can be used interchangeably, as appropriate, without departing from the scope of the present disclosure. Moreover, the present disclosure contemplates that many users can use one computer 402 and one user can use multiple computers 402.

Described implementations of the subject matter can include one or more features, alone or in combination.

For example, in a first implementation, a computer-implemented method, including the following. Permeabilities are measured from a rock sample at different pressures using single-component gas and bulk gas viscosity values. The rock sample is representative of rock used in a reservoir simulation. For each gas component of reservoir gas, porosities are determined, including determining mean free paths for a range of temperatures and pressures encompassing conditions for both reservoir simulation input and the measured permeabilities. A characteristic pore radius for the rock is determined using the measured permeabilities and the determined porosities. Viscosity adjustment factors for a predefined range of temperatures and pressures are determined using the measured permeabilities. Adjusted gas viscosities for the predefined range of temperatures and pressures and the measured permeabilities are determined using the viscosity adjustment factors. The reservoir simulator is executed using the adjusted gas viscosities.

The foregoing and other described implementations can each, optionally, include one or more of the following features:

A first feature, combinable with any of the following features, where measuring the permeabilities includes using a Klinkenberg method to measure the permeabilities.

A second feature, combinable with any of the previous or following features, where determining the characteristic pore radius for the rock includes using a Carmen-Kozeny (CK) equation to determine the characteristic pore radius for the rock.

A third feature, combinable with any of the previous or following features, where determining the viscosity adjustment factors for the range of temperatures and pressures includes using one of a Beskok-Karniadakis equation or a Helmholtz equation to determine the viscosity adjustment factors.

A fourth feature, combinable with any of the previous or following features, the method further including plotting graphs showing relationships among two or more of the permeabilities and viscosities.

A fifth feature, combinable with any of the previous or following features, where the reservoir simulation is used in production operations of one or more of oil wells and gas wells.

A sixth feature, combinable with any of the previous or following features, the method further including providing results of the reservoir simulation in a user interface for presentation to a user; and updating production operations based on user selections made in the user interface.

In a second implementation, a non-transitory, computer-readable medium storing one or more instructions executable by a computer system to perform operations including the following. Permeabilities are measured from a rock sample at different pressures using single-component gas and bulk gas viscosity values. The rock sample is representative of rock used in a reservoir simulation. For each gas component of reservoir gas, porosities are determined, including determining mean free paths for a range of temperatures and pressures encompassing conditions for both reservoir simulation input and the measured permeabilities. A characteristic pore radius for the rock is determined using the measured permeabilities and the determined porosities. Viscosity adjustment factors for a predefined range of temperatures and pressures are determined using the measured permeabilities. Adjusted gas viscosities for the predefined range of temperatures and pressures and the measured permeabilities are determined using the viscosity adjustment factors. The reservoir simulator is executed using the adjusted gas viscosities.

The foregoing and other described implementations can each, optionally, include one or more of the following features:

A first feature, combinable with any of the following features, where measuring the permeabilities includes using a Klinkenberg method to measure the permeabilities.

A second feature, combinable with any of the previous or following features, where determining the characteristic pore radius for the rock includes using a Carmen-Kozeny (CK) equation to determine the characteristic pore radius for the rock.

A third feature, combinable with any of the previous or following features, where determining the viscosity adjustment factors for the range of temperatures and pressures includes using one of a Beskok-Karniadakis equation or a Helmholtz equation to determine the viscosity adjustment factors.

A fourth feature, combinable with any of the previous or following features, the operations further including plotting graphs showing relationships among two or more of the permeabilities and viscosities.

A fifth feature, combinable with any of the previous or following features, where the reservoir simulation is used in production operations of one or more of oil wells and gas wells.

A sixth feature, combinable with any of the previous or following features, the operations further including providing results of the reservoir simulation in a user interface for presentation to a user; and updating production operations based on user selections made in the user interface.

In a third implementation, a computer-implemented system, including one or more processors and a non-transitory computer-readable storage medium coupled to the one or more processors and storing programming instructions for execution by the one or more processors, the programming instructions instructing the one or more processors to perform operations including the following. Permeabilities are measured from a rock sample at different pressures using single-component gas and bulk gas viscosity values. The rock sample is representative of rock used in a reservoir simulation. For each gas component of reservoir gas, porosities are determined, including determining mean free paths for a range of temperatures and pressures encompassing conditions for both reservoir simulation input and the measured permeabilities. A characteristic pore radius for the rock is determined using the measured permeabilities and the determined porosities. Viscosity adjustment factors for a predefined range of temperatures and pressures are determined using the measured permeabilities. Adjusted gas viscosities for the predefined range of temperatures and pressures and the measured permeabilities are determined using the viscosity adjustment factors. The reservoir simulator is executed using the adjusted gas viscosities.

The foregoing and other described implementations can each, optionally, include one or more of the following features:

A first feature, combinable with any of the following features, where measuring the permeabilities includes using a Klinkenberg method to measure the permeabilities.

A second feature, combinable with any of the previous or following features, where determining the characteristic pore radius for the rock includes using a Carmen-Kozeny (CK) equation to determine the characteristic pore radius for the rock.

A third feature, combinable with any of the previous or following features, where determining the viscosity adjustment factors for the range of temperatures and pressures includes using one of a Beskok-Karniadakis equation or a Helmholtz equation to determine the viscosity adjustment factors.

A fourth feature, combinable with any of the previous or following features, the operations further including plotting graphs showing relationships among two or more of the permeabilities and viscosities.

A fifth feature, combinable with any of the previous or following features, where the reservoir simulation is used in production operations of one or more of oil wells and gas wells.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/nonvolatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of UI elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A method for integrating slip flow and Knudsen diffusion (SFKD) into a reservoir simulation of a reservoir, the method comprising:
    obtaining a rock sample, the rock sample being representative of rocks located at the reservoir;
    adjusting, the rock sample to a set of different pressures;
    applying, to the rock sample at each of the different pressures of the set, gases using single-component and bulk-phase gas viscosity values;
    measuring, at each of the different pressures of the set, respective permeability values of the rock sample, the permeability values being a function of the single-component and the bulk-phase gas viscosity values;
    performing, based on the measuring, SFKD adjustments to each gas component value of a reservoir gas, the adjustments representing composite SFKD effects for realistic gas mixtures for the reservoir gas;
    determining for each adjusted gas component of the reservoir gas, porosities including mean free paths for a range of temperatures and pressures encompassing conditions for both reservoir simulation input and the measured permeability values;
    determining a characteristic pore radius for the rock sample using the measured permeability values and the determined porosities;
    determining using the measured permeability values, viscosity adjustment factors for a predefined range of temperatures and pressures;
    determining using the viscosity adjustment factors, adjusted gas viscosities for the realistic gas mixtures for the reservoir gas, the gas viscosities being adjusted for the predefined range of temperatures and pressures and the measured permeability values;
    executing, by a reservoir simulator, the reservoir simulation using the adjusted gas viscosities, the reservoir simulation having an increased accuracy relative to a reservoir simulation that does not capture SFKD effects;
    based on executing the reservoir simulator, generating a prediction for an amount of production from one or more existing fractured wells at the reservoir;
    based on the prediction, selecting one or more locations in the reservoir; and
    updating production operations at the reservoir by performing hydraulic fracturing at the one or more locations.

2. The method of claim 1, wherein measuring the permeabilities comprises determining a permeability based on a gas-viscosity value using an equation, wherein K' is a pseudo-permeability value, K is a rock permeability value, b is a Klinkenberg factor, P is a pressure, Qg is a volumetric gas flow, gbulk is a bulk-phase gas viscosity value, L is a length of the rock sample, $\Delta P$ is a pressure drop across the length, and A is a cross-sectional area of the rock sample.

3. The method of claim 2, wherein a value of b is determined based on determining a plurality of values of K' as a function of P.

4. The method of claim 1, further comprising plotting graphs showing relationships among two or more of the permeabilities and viscosities.

5. The method of claim 1, wherein the reservoir simulation is used in production operations of one or more of oil wells and gas wells.

6. The method of claim 5, further comprising:
providing results of the reservoir simulation in a user interface for presentation to a user; and
updating production operations based on user selections made in the user interface.

7. A non-transitory, computer-readable medium storing one or more instructions for integrating slip flow and Knudsen diffusion (SFKD) into a reservoir simulation, the instructions being executable by a computer system to perform operations comprising:
adjusting a rock sample to a set of different pressures, the rock sample being representative of rocks located at a reservoir being simulated in the reservoir simulation;
causing application, to the rock sample at each of the different pressures of the set, gases using single-component and bulk-phase gas viscosity values;
receiving measurements, for at each of the different pressures of the set, of respective permeability values of the rock sample, the permeability values being a function of the single-component and the bulk-phase gas viscosity values;
performing, based on the measuring, SFKD adjustments to each gas component value of a reservoir gas, the adjustments representing composite SFKD effects for realistic gas mixtures for the reservoir gas;
determining for each adjusted gas component of the reservoir gas, porosities including mean free paths for a range of temperatures and pressures encompassing conditions for both reservoir simulation input and the measured permeability values;
determining a characteristic pore radius for the rock sample using the measured permeability values and the determined porosities;
determining using the measured permeability values, viscosity adjustment factors for a predefined range of temperatures and pressures;
determining using the viscosity adjustment factors, adjusted gas viscosities for the realistic gas mixtures for the reservoir gas, the gas viscosities being adjusted for the predefined range of temperatures and pressures and the measured permeability values;
executing, by a reservoir simulator, the reservoir simulation using the adjusted gas viscosities, the reservoir simulation having an increased accuracy relative to a reservoir simulation that does not capture SFKD effects;
based on executing the reservoir simulator, generating a prediction for an amount of production from one or more existing fractured wells at the reservoir;
based on the prediction, selecting one or more locations in the reservoir; and
updating production operations at the reservoir by causing performance of hydraulic fracturing at the one or more locations.

8. The non-transitory, computer-readable medium of claim 7, wherein measuring the permeability values comprises determining a permeability based on a gas-viscosity value using an equation $K'=K \cdot (1+b/P)=(Q_g \cdot \mu_{gbulk} \cdot L)/(\Delta P \cdot A)$, wherein K' is a pseudo-permeability value, K is a rock permeability value, b is a Klinkenberg factor, P is a pressure, $Q_g$ is a volumetric gas flow, $\mu_{gbulk}$ is a bulk-phase gas viscosity value, L is a length of the rock sample, $\Delta P$ is a pressure drop across the length, and A is a cross-sectional area of the rock sample.

9. The non-transitory, computer-readable medium of claim 8, wherein a value of b is determined based on determining a plurality of values of K' as a function of P.

10. The non-transitory, computer-readable medium of claim 7, the operations further comprising plotting graphs showing relationships among two or more of the permeabilities and viscosities.

11. The non-transitory, computer-readable medium of claim 7, wherein the reservoir simulation is used in production operations of one or more of oil wells and gas wells.

12. The non-transitory, computer-readable medium of claim 11, the operations further comprising:
providing results of the reservoir simulation in a user interface for presentation to a user; and
updating production operations based on user selections made in the user interface.

13. A computer-implemented system, comprising:
one or more sensors configured to measure permeability values for rock samples;
one or more processors; and
a non-transitory computer-readable storage medium coupled to the one or more processors and storing programming instructions for integrating slip flow and Knudsen diffusion (SFKD) into a reservoir simulation, instructions being for execution by the one or more processors, the programming instructions instructing the one or more processors to perform operations comprising:
adjusting a rock sample to a set of different pressures, the rock sample being representative of rocks located at a reservoir being simulated in the reservoir simulation;
causing application, to the rock sample at each of the different pressures of the set, gases using single-component and a bulk-phase gas viscosity values;
receiving measurements from the one or more sensors for at each of the different pressures of the set, respective permeability values of the rock sample the permeability values being a function of the single-component and the bulk-phase gas viscosity values;
performing, based on the measuring, SFKD adjustments to each of the gas component gas viscosity value and the bulk gas viscosity value of a reservoir gas, the adjustments representing composite SFKD effects for realistic gas mixtures for the reservoir gas;
determining for each adjusted gas component of the reservoir gas, porosities including mean free paths for a range of temperatures and pressures encompassing conditions for both reservoir simulation input and the measured permeability values;
determining a characteristic pore radius for the rock sample using the measured permeability values and the determined porosities;
determining using the measured permeability values, viscosity adjustment factors for a predefined range of temperatures and pressures;
determining using the viscosity adjustment factors, adjusted gas viscosities for the realistic gas mixtures for the reservoir gas, the gas viscosities being adjusted for the predefined range of temperatures and pressures and the measured permeability values; and executing, by a reservoir simulator, the reservoir simulation using the adjusted gas viscosities, the reservoir simulation having an increased accuracy relative to a reservoir simulation that does not capture SFKD effects;

based on executing the reservoir simulator, generating a prediction for an amount of production from one or more existing fractured wells at the reservoir;

based on the prediction, selecting one or more locations in the reservoir; and updating production operations at the reservoir by causing performance of hydraulic fracturing at the one or more locations.

14. The computer-implemented system of claim 13, wherein measuring the permeability values comprises determining a permeability based on a gas-viscosity value using an equation $K'=K \cdot (1+b/P)=(Q_g \cdot \mu_{gbulk} \cdot L)/(\Delta P \cdot A)$, wherein $K'$ is a pseudo-permeability value, $K$ is a rock permeability value, $b$ is a Klinkenberg factor, $P$ is a pressure, $Q_g$ is a volumetric gas flow, $\mu_{gbulk}$ is a bulk-phase gas viscosity value, $L$ is a length of the rock sample, $\Delta P$ is a pressure drop across the length, and $A$ is a cross-sectional area of the rock sample.

15. The computer-implemented system of claim 14, wherein a value of $b$ is determined based on determining a plurality of values of $K'$ as a function of $P$.

16. The computer-implemented system of claim 13, the operations further comprising plotting graphs showing relationships among two or more of the permeabilities and viscosities.

17. The computer-implemented system of claim 13, wherein the reservoir simulation is used in production operations of one or more of oil wells and gas wells.

* * * * *

UNITED STATES PATENT AND TRADEMARK OFFICE
CERTIFICATE OF CORRECTION

PATENT NO. : 11,988,794 B2
APPLICATION NO. : 17/039012
DATED : May 21, 2024
INVENTOR(S) : Kenneth Richard Kibodeaux and HuiHai Liu It is certified that error appears in the above-identified patent and that said Letters Patent is hereby corrected as shown below:

In the Claims

In Column 16, Line 66, Claim 2, please replace "Qg" with -- $Q_g$ --.

In Column 18, Line 43, Claim 13, please replace "and a" with -- and --.

In Column 18, Line 46, Claim 13, please replace "sample" with -- sample, --.

In Column 18, Line 50, Claim 13, please replace "each of the" with -- each --.

In Column 18, Line 50-51, Claim 13, please replace "component gas viscosity value and the bulk gas viscosity" with -- component --.

Signed and Sealed this
Sixteenth Day of July, 2024

Katherine Kelly Vidal
*Director of the United States Patent and Trademark Office*